United States Patent [19]

Yializis

[11] Patent Number: 4,482,931
[45] Date of Patent: Nov. 13, 1984

[54] METALLIZED CAPACITOR WITH IMPROVED BILAYER ELECTRODES

[75] Inventor: Angelo Yializis, South Glens Falls, N.Y.

[73] Assignee: General Electric Company, Hudson Falls, N.Y.

[21] Appl. No.: 585,036

[22] Filed: Mar. 6, 1984

Related U.S. Application Data

[63] Continuation of Ser. No. 295,928, Aug. 24, 1981, abandoned.

[51] Int. Cl.³ .......................... H01G 1/01; H01G 1/10
[52] U.S. Cl. ..................................... 361/273; 361/304; 361/305; 361/314
[58] Field of Search ............... 361/273, 304, 305, 314; 428/626

[56] References Cited

U.S. PATENT DOCUMENTS

| | | |
|---|---|---|
| 2,934,687 | 4/1960 | Maylandt et al. |
| 3,179,862 | 4/1965 | Dubilier |
| 3,298,864 | 1/1967 | Maylandt |
| 3,450,968 | 6/1969 | Cox .................... 361/314 |
| 3,757,177 | 9/1973 | Buehler ............... 361/305 |
| 3,872,360 | 3/1975 | Sheard ................ 361/305 |
| 3,987,348 | 10/1976 | Flanagan et al. ...... 361/314 |
| 4,089,037 | 5/1978 | Rayburn .............. 361/305 |
| 4,215,385 | 7/1980 | Behn et al. .......... 361/273 |

FOREIGN PATENT DOCUMENTS

| | | |
|---|---|---|
| 2106833 | 8/1972 | Fed. Rep. of Germany . |
| 2700013 | 7/1978 | Fed. Rep. of Germany ...... 361/273 |
| 2703636 | 8/1978 | Fed. Rep. of Germany . |
| 2047398 | 12/1971 | France . |
| 882179 | 11/1961 | United Kingdom . |

OTHER PUBLICATIONS

A. Yializis et al Corrosion in Metallized Capacitors Proceedings of IEEE, International Symposium on Electrical Insulation, Boston, Mass., Jun. 1980.

*Primary Examiner*—C. L. Albritton
*Assistant Examiner*—Alfred S. Keve
*Attorney, Agent, or Firm*—Arthur E. Bahr; James J. Lichiello

[57] ABSTRACT

A high stress corrosion resistant metallized capacitor is disclosed having at least one electrode consisting of a metallic bilayer vapor deposited on a dielectric strip. In a preferred embodiment, a layer of aluminum is covered by a second metal layer which is between about 1/6 to 1/12 the thickness of the aluminum layer and is continuous throughout. The aluminum layer extends beyond the second layer in a marginal area.

30 Claims, 5 Drawing Figures

METALLIZED CAPACITOR WITH IMPROVED BILAYER ELECTRODES

This application is a continuation of application Ser. No. 295,928, filed Aug. 24, 1981, now abandoned.

BACKGROUND OF THE INVENTION

This invention relates to metallized alternating current (AC) capacitors and more particularly to a high stress metallized capacitor with electrodes which comprise multiple thin metal layers of dissimilar metals laid down on a dielectric strip.

DESCRIPTION OF THE PRIOR ART

A metallized capacitor is one in which one or both electrodes are provided by means of a very thin metallic layer on a solid dielectric strip, a common example being a vapor deposited aluminum layer on a polypropylene resin strip. These strips may be wound together in roll form to provide an electrical capacitor with metallized electrodes and polypropylene dielectrics. The roll may be placed in a container and suitably impregnated with a dielectric liquid. It may also be suitably encapsulated and used in the dry state, or, placed in a container wherein only the roll ends are exposed to a dielectric liquid. This latter capacitor may be referred to as a semi or incompletely impregnated capacitor and it is the semi-impregnated or dry type of capacitor to which this invention is primarily directed. One example of such a capacitor, which utilizes a small amount of fluid is disclosed and claimed in U.S. Pat. No. 3,987,348—Flanagan et al, assigned to the same assignee as the present invention.

In the normal operation of metallized electrical capacitors, particularly those rated above about 250 volts AC there are two significant deleterious operating deficiencies denoted, (a) clearings and (b) corrosion, which affect the operation and life of the capacitor. The clearing operation is repetitive over the life of a capacitor and is related to a deficiency in the dielectric which may cause certain electrical discharges such as corona to be generated between electrodes. In prior capacitors with self-supporting aluminum foil electrodes, these discharges may eventually erode, cross over or penetrate the solid dielectric so that electrical short circuiting occurs between electrodes with a violent failure of the capacitor. However, in a metallized capacitor the heat of any electrical discharge across the dielectric, as described, vaporizes an increasingly larger area of the thin metal layer, thus increasing the arc length until it self-extinguishes. Alternatively described, should a dielectric fault and puncture occur in the dielectric of a metallized capacitor the very thin film of metallizing will burn back and away from the failure site, isolating the fault. But for the fact that a metallized capacitor has this inherent clearing effect, the corona discharge or arc would cause an early failure of the capacitor. However, the disadvantage of this self-clearing is an overall loss of capacitance in the capacitor through the loss of electrode area by vaporization.

Corrosion is the second factor occurring in the normal operation of metallized capacitors. This phenomenon is noted where certain areas of the thin metallized layer are converted to an oxide, e.g., aluminum oxide which is not a good electrical conductor and therefore some effective electrode area is lost. The reasons for this corrosion phenomena are unclear, but with high electrical stress and thin electrodes of aluminum, corrosion is a rapidly spreading and wasting operation. This is particularly found in AC capacitors when the voltage stress on a polypropylene dielectric film is on the order of above about 1000 volts per mil.

Since metallized capacitors may lose as much as 10% of their capacity over a relatively short period of time because of these factors, they become unacceptable for some applications, and they may require a considerable uneconomic design for compensatory purposes. Also the loss of capacitance of a capacitor may pose as a possible source of host equipment failure because of capacitance loss in the capacitor.

The loss of capacitance due to the two deficiencies of clearings and corrosion is at present the most serious disadvantage in high stress AC metallized capacitors and a limiting factor on their useful life. The more important one of the above two deficiencies is the control of corrosion, quite apart from clearings, because corrosion is the largest contributor to loss of capacitance, and is quite independent from clearings. However, at the same time whatever is done to control corrosion should not deleteriously affect clearings, i.e., make them more violent with greater energy release. For example, the corrosion problem is not overcome merely by the use of a thicker metal electrode. A thicker metal electrode means an electrode which displays most disadvantageous delayed and violent clearing effects, a result that is counter to the primary purpose of a metallized capacitor. Thinner electrodes are more desirable, because of their favorable economics. However, the corrosion problem is not counteracted by thinner electrodes as they merely exacerbate the problem by supporting a multiplicity of unnecessary clearings. While different metals do have different corrosion rates, it is by far desirable to continue to use such proven metals as aluminum and zinc for the layer electrode and these metals are most prone to corrosion.

Since both clearings and corrosion are electrical stress and electrical field strength related, and the conductivity of the aluminum, or the thickness of the aluminum is fixed within a narrow range for effective clearing, the mere modification of corrosion effects while a distinct improvement, only permits a given high stress capacitor to operate somewhat longer, i.e., with less capacitance loss. Excessive clearings will continue to cause loss of capacitance. What is important is that both clearing effects and corrosion effects require modification for improved performance high stress capacitors. While lowering the voltage stress on the dielectric accomplishes both purposes it is grossly uneconomical to do so.

SUMMARY OF THE INVENTION

It has now been discovered that corrosion deficiency of metallized capacitors may be significantly minimized by the use of unique, very thin composite, dual or bilayer of electrode metals for a single electrode design, without detracting from the desirable clearing effects. This discovery is accomplished by the use of a bimetal layer electrode of dissimilar metals where the outer layer has a higher resistivity than the inner layer and the overall thickness of the dual layer is thinner than the prior single layer.

This invention will be better understood when taken in connection with the following description and the drawings in which FIG. 1 is an illustration of a dry metallized capacitor roll section embodying the electrode structure of this invention.

DESCRIPTION OF PREFERRED EMBODIMENTS

Figure 1:
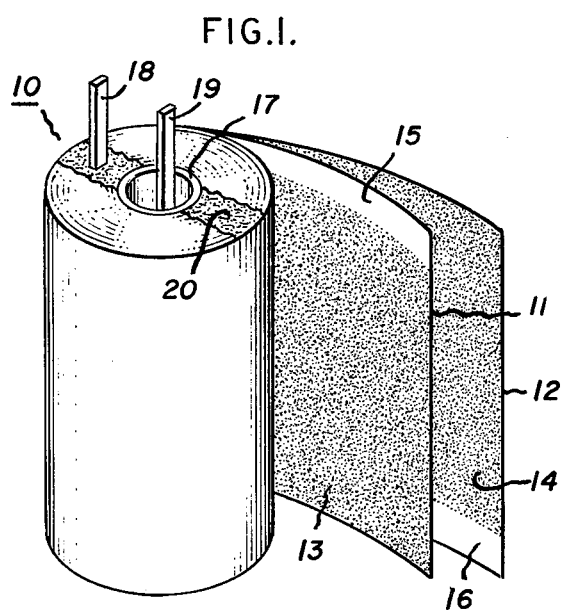

Referring now to FIG. 1 there is shown the kind of capacitor in which optimum benefits of this invention may be obtained. This capacitor utilizes structure similar to that in the noted Flanagan patent for voltages above about 370 volts and particularly above about 440 volts. In FIG. 1 there is disclosed one preferred embodiment of this invention as a capacitor roll section 10. Roll section 10 comprises a pair of dielectric material strips 11 and 12 of polypropylene which have been metallized as illustrated by metallizing surfaces or coatings 13 and 14. As is the usual practice, the strips 11 and 12 are metallized in a manner which leaves metal free margins 15 and 16 along opposite edges of roll 10. In the winding process the roll 10 is wound on a core member 17, and the strips 11 and 12 are laterally offset with respect to each other in order that each roll edge or end will display an offset with its metallized coatings exposed at the edge of the strip. Thereafter, suitable electrical leads 18 and 19 may be attached to the exposed metal coating through utilization of the well-known schooping process to provide a metal layer 20, and the roll is then placed in a can or casing as illustrated in FIG. 2.

Figure 2:
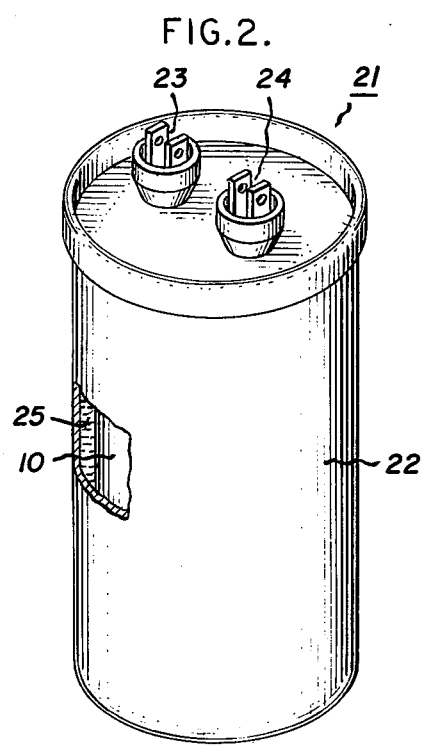
FIG. 2 is an illustration of the completed capacitor assembly utilizing the roll section of FIG. 1.

In FIG. 2, the capacitor 21 includes a casing or can 22 which contains a single roll 10, and the leads 18 and 19 from the roll connect to the terminals 23 and 24. Casing 22 may be a sealed can type which is filled with a dielectric fluid 25 and then sealed, or it may be a protective kind of casing without any liquid impregnant, In any event it is the metallized coatings 13 and 14 of FIG. 1 to which this invention is primarily directed, and which are described with respect to FIG. 3.

Figure 3:
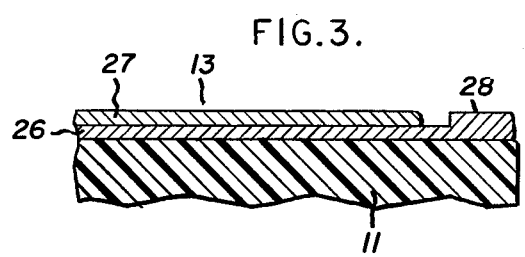
FIG. 3 is an enlarged illustration of one form of a bilayer metallized electrode structure of this invention.

Referring now to FIG. 3 the dielectric strip 11 is illustrated in sectional form as a dielectric synthetic resin, for example, polypropylene film, with a composite metal layer or coating 13 which is vacuum deposited or otherwise laid down on or attached to the strip 11. As illustrated the composite layer 13 comprises a bilayer or a dual layer of metals 26 and 27. These metals generally cover the dielectric strip, or more specifically, they are continuous and coextensive with the effective capacitor electrode area of the capacitor.

The first metal layer 26 is the primary electrode layer of the capacitor. A typical metal for this layer is high purity aluminum of 99.99% aluminum. Ordinarily, such a layer may have a thickness in the range of 175 A° to 250 A° and a corresponding resistance of from 5 to 8Ω/□ for this invention. Ohms/square is an acceptable measurement for evaporated metal layers of extreme thinness because the resistance between two ends of such a layer is substantially independent of the area of the layer. The resistance between any two points on the layer depends substantially only on the thickness of the layer. This layer covers all of the strip 11 except those areas used to offset margins. The reason for this total kind of coverage arises from the fact that studies and examination of metallized capacitors indicate that corrosion is found throughout the capacitor roll, and that it may be insufficient or uneconomical to provide corrosion protection on less than all available capacitor effective electrode area surfaces.

The second layer 27 is a specific metal or a specific alloy, different from the first metal, which must have clearly defined electrochemical properties to control two functions (a) permitting the layer 26 to be made unusually and extremely thin for improved clearability and (b) controlling corrosion by its less oxidizing characteristics and its ability to remain in a substantially continuous metallic state during the operation of the capacitor. The right metal also provides a layer 27 which, when combined in thickness with the thickness of the base layer 26, will show a combined thickness less than the design thickness of a single prior art aluminum layer.

Preferred metals for the layer 27 include iron, chromium, nickel, and their alloys such as NiCr. The resistance of layers of these metals lies in the range of about $10^4$ to $10^{10}$ ohms per square when deposited in layers in accordance with the invention. These metals are members of a broader class of metals defined as those having a higher melting point than the metals of the first layer and a significantly lesser high field electrochemical corrosion rate than the metals of the first layer in the same operative environment. They also display a higher resistance than the metal of the first layer—taking its thinness into consideration, and may be deposited on the first layer in a continuous metallic state in extremely thin layers.

It is important that the second metal layer tends to remain mostly in its metallic form in the capacitor, i.e., that it does not readily convert to its oxide from exposure to air, etc. Metallic conductance is preferable although some oxide semi-conducting properties are not detrimental. Potential corrosion sites should have an overlap or roofing metal with metallic and semi-conducting conductivity. Such metals as zinc, copper, etc. are not desirable because of their rapid and highly corrosive nature in very thin layers. Change or loss of capacitance is greatly minimized by the metallic conductive coating which preserves the total conducting electrode structure and concept.

While the use of alloys including aluminum and copper as a single electrode will diminish corrosion to some extent, a considerable amount of the copper is required and this adversely changes the resistance of the electrode. The metals of layer 27 of the present invention have a higher resistivity than that of the pure aluminum and a higher melting point. Their resistance lies generally in the range of about $10^4$ to $10^{10}$ ohms per square. During a clearing process the second layer need not melt. Their higher melting point and thinness will cause them to quickly evaporate during clearing without contributing any adverse clearing effects. By the selection of a first layer which is thinner than prior aluminum layers there is an advantageous clearing.

Preferable ratios of the thicknesses of the individual layers are that the second layer is from 1/6 to 1/12 preferably from ⅛ to 1/12 the thickness of the first layer, with a first layer thickness of less than about 250 A°. It is important to the present invention that the second layer be substantially continuous in two forms—first, it must be substantially continuous over the effective electrode area and second it must be deposited as an unbroken layer in the sense that some metals when deposited in extremely thin layers, e.g. less than about 50 A° from individual islands which may not be connected physically or electrically. The reasons for the recited thickness relationships, i.e. an aluminum layer of a thickness less than about 250 A° and having a resistance of about 4 to 7 ohms per square and a second metal layer of a thickness less than about 20 A° to 40 A° and having a resistance of about $10^4$ to $10^{10}$ ohms per square, are that it is desirable for essentially all of the current flow to be carried by the first layer and for the second layer to have a higher resistance and higher melting point.

Metallized polypropylene film with bilayers of aluminum and, nickel and/or iron, have demonstrated superior performance when compared to prior art capacitors. For example, loss of capacitance can be reduced by as much as 90% or more over the life of the capacitor, and by reason thereof the electrical stress level on the film of these capacitors can be increased above about 1200 per mil (46 volts/$\mu$) for example, in the range of 1500 to 2000 volts per mil (82 volts/$\mu$) and higher. At the same time, the material economics are improved by having two layers in which the combined thickness is less than the thickness of the prior single layers. Representative examples of the practices of this invention are illustrated as follows. In all examples the metal layers were deposited by means of the well known vacuum deposition process.

EXAMPLE I

In this example several capacitors were assembled following the structures of FIGS. 1, 2, and 3 with a capacity of 15 to 65 uf. The important features of this construction is the thinness of the polypropylene film, i.e., 8 $\mu$M and the thinness of the bi-layer coating. The bi-layer used in this example comprised a base layer of aluminum and a second layer of a nickel-chromium alloy, e.g. 80% Ni and 20% Cr over the aluminum layer. In all instances the aluminum layer was between about 175 A° and 250 A° thickness and the NiCr layer was between about 20 A° to 30 A°. The control is generally a prior art capacitor following the same general construction of other capacitors in the example but having a single aluminum layer of a thickness of about 500 A°.

EXAMPLE I

| Type of Capacitor | Test Condition | Test Duration | Capacitance Loss | % of Shorts |
|---|---|---|---|---|
| Controls | 470 VAC/80° C. | 1000 Hr. | 5 to 8% | 5–25% |
| High Stress Bilayer With Al/NiCR Electrodes | 470 Vac/80° C. | 2000 Hr. | 0.3% | 0% |
|  | 550 Vac/80° C. | 2000 Hr. | 0.8% | 0% |
|  | 660 VAC/80° C. | 500 Hr. | 2.0% | 0% |

What is evident from Example I is that the capacitance loss with time is between about 5% to 8% for the prior art control unit and as low as 0.3 for the aluminum base layer and a nickel chrome coating. This is surprising in view of the fact that the units were tested at 470 to 660 volts and at 80° C., a most stringent set of test conditions for such a thin film dielectric system. The total thickness of the bimetal layer is markedly less than prior art thicknesses of single layers. The ordinary life of capacitors of this kind, including control capacitors, is usually more than 20,000 hours.

EXAMPLE II

Another bi-layer electrode that has eliminated the high field electrochemical corrosion process in single metal polypropylene capacitors is the Al-Fe or Fe-Al bi-layer. Iron is one of the most desirable bi-layer materials because it remaines physically and electrically continuous at thicknesses lower than 20 A° and in addition, it is relatively inexpensive. Al-Fe bi-layer electrode capacitors have been tested successfully at stress levels substantially higher than the control units (refer to example 1). In this example II the aluminum layer was from 200 A° to 250 A° thickness and the iron layer was from 20 A° to 30 A° thickness. The dielectric was polypropylene film of 8$\mu$ thickness.

| Type of Capacitor | Test Condition | Test Duration | Cap. Loss | % Of Shorts |
|---|---|---|---|---|
| High Stress | 550 VAC/80° C. | 1200 HR. | <0.5% | <10% |
| Bilayer With Al—Fe Electrodes | 600 VAC/80° C. | 500 Hr. | " | 0% |
|  | 660 VAC/R.T. | 500 Hr. | " | 0% |

As can be seen from this Example II, the excellent low capacitance loss results of Example I are confirmed, and the capacitance loss improvement illustrated in excess of 1200 hours of life at extreme stresses and temperatures is exceptional.

In the practice of this invention it has been discovered that a significant number of capacitor failures were not dielectric or capacitance loss failures, but were actually caused by the electrical connection, (FIG. 1), of the leads or taps 17 and the metal layer 13 through the schooping material 20. In the assembly operation the strips 11 and 12 have uncoated margins 15 and 16 at each end and may also be offset at each end so that the metal layer 13 of one electrode is distinctly removed from the schooping 20 at the end. Some of the coatings 27 of this invention have been found to interfere, on a time delay basis, with the joining to the common schooping solder employed. Consequently in the preferred practice of this invention a second margin 28 FIG. 3 is utilized at the metal layer margin of strips 11. Margin 28 exposes the underlay metal of aluminum to the usual schooping process with excellent results and removes an otherwise hidden problem with these capacitors with various coating metals. In addition, the exposed aluminum layer at 28 may be made thicker for better joining characteristics. In the examples of the present invention the aluminum margin is made about two times the aluminum layer thickness.

Advantageous results are obtained when silicon oil is used in the masking part of the metal vapor deposition process because the film margins absorb a quantity of this oil for increased corona resistance at the roll ends in the finished capacitors.

Representative capacitors embodying the graded electrode feature are included in the following example.

EXAMPLE III

In this example capacitors were made up as described in Example I, but with graded electrodes where the aluminum was between 200 A° to 250 A° thickness. The iron was 20 A° to 30 A° thickness and the iron layer terminated about 2 to 3 mm from the edge of the strip. At this edge the thickened or graded aluminum was 400 A° to 500 A° thick. Polypropylene film was 8μ thickness.

| Capacitor Type | Test Condition | Test Duration | Cap Loss % | % Of Shorts |
|---|---|---|---|---|
| High Stress Bilayer With Al—Fe Graded Electrodes | 550 VAC/100° C. | 500 Hr. | <0.5% | 0% |
| | 550 VAC/−30° C. | 500 Hr. | <0.5% | 0% |

Figure 4:
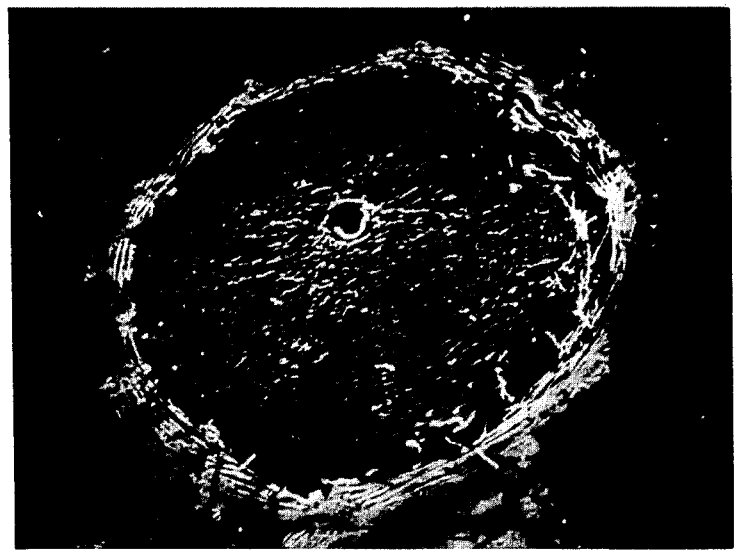
FIG. 4 is a magnified photo (100X) of a prior single layer metallized film showing the effect of a clearing site.

Teardown analysis of many capacitors utilizing the practices of this invention, with 8μ thick film and voltage ratings of 550 VAC to 660 VAC show dramatic lessening effects of clearing and negligible corrosion. A clearance occurrence is illustrated in the FIG. 4 photomicrograph. The clearance is defined by central aperture or puncture and an annular clear area. The clear area is the polypropylene film from which an aluminum area has been vaporized. The use of the bi-layer of this invention neither increases nor decreases the number of clearings which take place. What a bi-layer will do is to minimize the effects of clearings such as reducing their violence or the area affected. They accomplish these purposes in one respect by means of their thinner inner layer which will be more permissive of lower energy clearances and avoid the larger and violent ones. At the same time, the outer metal layer of higher resistance serves to implement the integrity of the outer metal layer.

Figure 5:
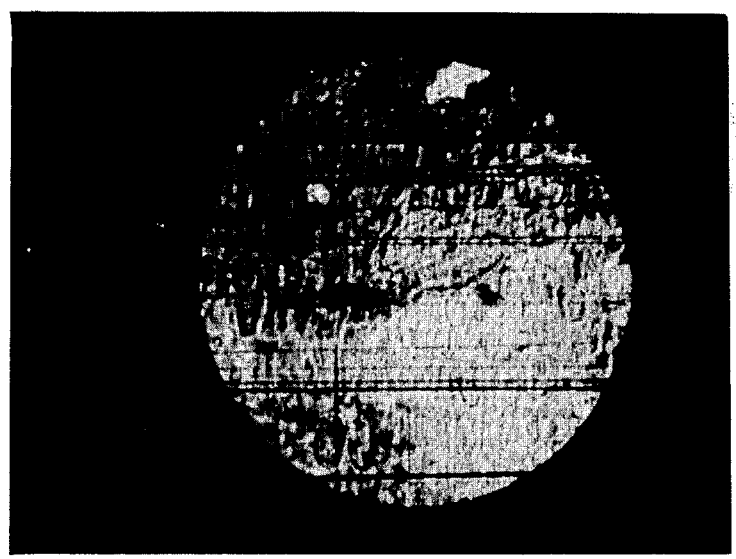
FIG. 5 is a magnified photo (55X) of a typical prior single layer metallized capacitor electrode showing the effects of a corrosion site.

In FIG. 5 there is illustrated a photomicrograph showing the effects of corrosion on an aluminum electrode surface. In this FIG. the lighter area is a spot of aluminum oxide. The darker area is aluminum metal. This oxide spot starts at the interface of the aluminum metal layer and the polypropylene film and projects completely through the metal. Consequently the metal converted is metal electrode removed from the active electrode surface. As opposed to clearings, corrosion is a growth process, and elevated temperatures, voltages, and frequencies accelerate the growth conditions.

The dual layers of this invention may be generated by well known plating, deposition, and coating processes. Vapor deposition in vacuum is a preferred process. It can provide for deposition of an alloy such as nickel chrome for simultaneous or serial deposition of different metals in the same chamber. This reduces the chances of contamination of the surfaces and limits oxidation of the metal layers during the process. Some of the second metal may be found diffused into the first metal layer. The bi-layers of this invention may be aluminum as the outer layer of metal and the layers may comprise one layer of aluminum for example on one side of a film strip and a thinner layer of iron for example on the opposite side.

An important concept of this invention is the thickness ratios of the metal layers. It has been discovered that, following the practices of this invention all thicknesses may be drastically reduced and improved benefits obtained. Many metals are excluded for this reason and significantly higher stresses can be utilized. This invention does not merely make a given capacitor operate more effectively by limiting corrosion, but in effect provides a unique, higher stressed capacitor, which also has minimal corrosion.

Since very thin second layers are used it is important to verify their continuous metallic state, as well as their metallic state after life tests of capacitor operation. Among such tests are electron transmission and auger and esca spectroscopy. Another test which has been utilized in the practice of this invention is a relative solution test where certain fluids will selectively dissolve an oxide or the base metal, and calculations will yield the presence or absence of one or the other.

The capacitors of this invention may be improved for different applications by having their roll ends treated with a dielectric fluid such as described in the noted Flanagan patent. The roll ends may also be coated with a semi-solid or solid material such as an epoxy compound.

While this invention has been disclosed with respect to particular embodiments thereof, numerous modifications may be made by those skilled in the art without departing from its true spirit and scope. Therefore, it is intended that the appended claims cover all such modifications and variations which come within the true spirit and scope of the present invention.

What is claimed as new and desired to be secured by Letters Patent of the United States is:

1. A metallized electrical capacitor comprising a pair of spaced electrodes and a dielectric material strip therebetween, wherein the rated voltage of said capacitor is adapted to impose a stress on said dielectric of greater than about 1,000 volts per mil thickness, at least one of said electrodes comprising a composite metal coating on said dielectric strip, said composite metal coating including first and second layers of different metals, said first metal layer having a thickness which provides a resistance in the range of 4 to 7 ohms per square, said second metal layer having a thickness which provides a resistance of less than about 10 ohms per square, said second metal layer being vapor deposited at a uniform thickness of less than about 20 A° to 40 A° to provide electrical continuity throughout, said metal of said second metal layer having a higher melting point than said metal of said first metal layer.

2. The invention as recited in claim 1 wherein said metal layers are adjacent each other.

3. The invention as recited in claim 1 wherein said second metal layer covers said first metal layer.

4. The invention as recited in claim 1 wherein said dielectric strip comprises a synthetic resin.

5. The invention as recited in claim 1 wherein said dielectric strip comprises polypropylene and said electrodes and said dielectric strip are wound to form a roll.

6. The invention as recited in claim 1 wherein one of said first and second metal layers is deposited directly on said strip and the other layer is deposited on the strip-deposited layer.

7. The invention as recited in claim 6 wherein said first metal layer comprises aluminum.

8. The invention as recited in claim 6 wherein the metal of said second metal layer is taken from the class consisting essentially of iron, nickel, and chromium.

9. The invention as recited in claim 8 wherein said dielectric strip comprises a polypropylene resin, said first metal layer comprises a vapor deposited high purity aluminum, and said second metal layer comprises vapor deposited iron.

10. The invention as recited in claim 8 wherein said second metal layer comprises iron.

11. The invention as recited in claim 8 wherein said second metal layer comprises nickel.

12. The invention as recited in claim 8 wherein said second metal layer comprises chromium.

13. The invention as recited in claim 8 wherein said second metal layer consists of an alloy of metals taken from the class consisting essentially of iron, nickel, and chromium.

14. The invention as recited in claim 13 wherein said alloy comprises nickel-chromium.

15. A metallized electrode strip for an electrical capacitor comprising a base strip of a synthetic resin material, a first metal layer covering said synthetic resin strip and extending to one longitudinal edge thereof and a second metal layer electrically continuous on said first metal layer spaced from said longitudinal edge to leave an exposed margin of said first metal layer therealong, said first metal layer having a thickness relative to said second metal layer adapted to cause said first metal layer to carry substantially all of the current in the electrode, and the metal of said second metal layer having a higher melting point than the metal of said first metal layer.

16. The invention as recited in claim 15 wherein said first metal layer comprises aluminum.

17. The invention as recited in claim 16 wherein said second metal layer consists of an alloy of metals taken from the class consisting of iron, nickel, and chromium.

18. The invention as recited in claim 17 wherein said alloy comprises nickel.

19. The invention as recited in claim 18 wherein said alloy comprises nickel and chromium.

20. An electrical capacitor comprising:
(a) a pair of spaced electrodes and a dielectric material therebetween,
(b) at least one of said electrodes comprising a base polypropylene dielectric strip and a metal bilayer thereon,
(c) said metal bilayer comprising a first metal layer on said dielectric strip and a second metal layer of a different metal disposed on said first metal layer,
(d) said capacitor having a rated voltage adapted to impose electrical stress on said dielectric strip above about 1200 volts per mil thickness,
(e) said first metal layer comprising aluminum and having a thickness which provides a resistance in the range of 4 to 7 ohms per square and said second metal layer including at least one metal taken from the class consisting of iron, nickel and chromium, and having a thickness which provides a resistance in the range of $10^{10}$ ohms per square,
(f) said second metal layer being electrically continuous throughout and being spaced from one longitudinal edge of said strip to expose said first metal layer as a margin along said strip.

21. The invention as recited in claim 20 wherein said second metal layer comprises iron.

22. The invention as recited in claim 20 wherein the edges of said dielectric strip contain a preabsorbed small quantity of a dielectric fluid.

23. The invention as recited in claim 20 wherein said spaced electrodes and said dielectric material are coiled to form a roll and the ends of said roll are coated with a dielectric material.

24. The invention as recited in claim 20 wherein said capacitor is enclosed in a casing which further contains a dielectric fluid.

25. An electrical capacitor having a voltage rating in the range of 370 volts AC to about 660 volts AC and comprising in combination:
(a) a pair of spaced electrodes and a dielectric material strip therebetween;
(b) at least one of said electrodes comprising a dual metal layer vapor deposited on said dielectric strip;
(c) said dielectric strip having a thickness less than about 8μ so that the voltage stress is in the range of 1200 to about 1500 volts per mil thickness at the rated voltage;
(d) the total thickness of said dual metal layer being in the range of 195 A° to 280 A° with a first metal layer of less than about 250 A° thickness and a second metal layer of less than about 40 A° thickness; and
(e) the metal of said second metal layer having a higher melting point than the metal of said first metal layer.

26. The invention as recited in claim 25 wherein said capacitor is enclosed in a casing which further contains a dielectric fluid.

27. The invention as recited in claim 1, wherein said first metal layer comprises aluminum and said second metal layer comprises a metal taken from the class consisting essentially of iron, nickel and chromium, one of said first and second metal layers being disposed directly on said dielectric strip and the other layer being disposed on the strip-deposited layer, and said first layer extending beyond said second layer along a marginal area at one longitudinal edge of said dielectric strip.

28. The invention as recited in claim 27, wherein said first metal layer is deposited directly on said dielectric strip and said dielectric strip is subject to a stress of between about 1000 to 2000 volts per mil.

29. The invention as recited in claim 27, wherein the aluminum of said first metal layer is deposited in said marginal area with a greater thickness than the remainder of said first layer.

30. The invention as recited in claim 16 wherein said synthetic resin strip has a thickness less than about 8 microns.

* * * * *

UNITED STATES PATENT AND TRADEMARK OFFICE
CERTIFICATE OF CORRECTION

PATENT NO. : 4,482,931
DATED : Nov. 13, 1984
INVENTOR(S) : Angelo Yializis

It is certified that error appears in the above-identified patent and that said Letters Patent is hereby corrected as shown below:

Column 8, line 35: "10" should read --$10^{10}$--.

Signed and Sealed this

Eighteenth Day of June 1985

[SEAL]

Attest:

DONALD J. QUIGG

Attesting Officer     Acting Commissioner of Patents and Trademarks